May 6, 1969  ICHIRO MURAKI ET AL  3,442,716
ALKALINE CELL
Filed Sept. 5, 1967
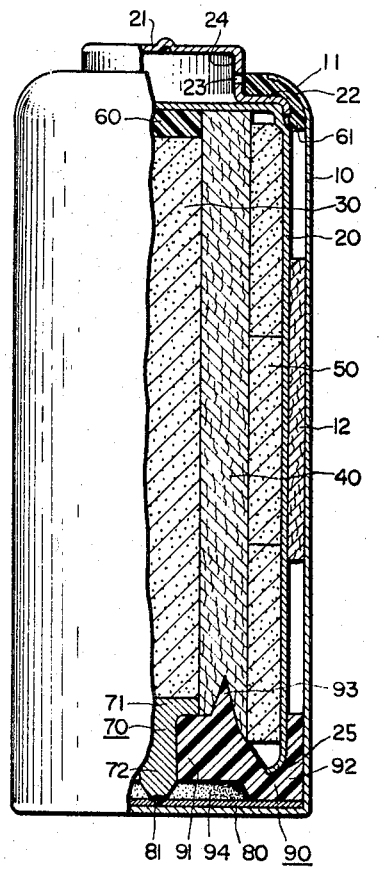
ICHIRO MURAKI
TAKASHI TSUCHIDA
KENICHI SHINODA
SHOJI MARUYAMA
        INVENTORS.
BY Eliot S. Gerber
        ATTORNEY.

United States Patent Office 3,442,716
Patented May 6, 1969

3,442,716
ALKALINE CELL
Ichiro Muraki, Hamamatsu-chi, Takashi Tsuchida, Kosai-cho, Kenichi Shinoda, Toyohashi-shi, and Shoji Maruyama, Kosai-cho, Japan, assignors to Fuji Denki Kagaku Kabushiki Kaisha, Tokyo, Japan, a corporate body of Japan
Filed Sept. 5, 1967, Ser. No. 665,513
Claims priority, application Japan, Oct. 31, 1966, 41/100,808
Int. Cl. H01m *1/02*
U.S. Cl. 136—133                                    8 Claims

ABSTRACT OF THE DISCLOSURE

An alkaline dry cell free from electrolyte creepage and leakage is constructed having an anode metal case and a cathode metal case. The cathode case has an opening facing the bottom of the anode case and holds active cell materials in place. A cathode cap with a venting structure is fitted over the top surface of the cathode case. The cell has a first insulating sealing member as a top closure. An insulating liquid absorbing member prevents seepage of any electrolyte from between the cathode case and the anode case. The anode has a current collector, a pointed portion of which perforates through a second bottom insulating sealing member and is electrically connected with the anode case.

---

This invention relates to electrochemical cells and more particularly to an alkaline dry cell.

Conventional dry cells using the alkaline electrolyte have the disadvantage of electrolyte creepage and leakage which is seriously harmful to cell life.

Alkaline dry cells of many types are air-tightly sealed to prevent leakage of the electrolyte. Nevertheless some of the alkaline electrolyte may be forced out to the exterior of the cell because of excessive internal pressures in the cell that may arise under abnormal operating conditions. Such electrolyte leakage is held to a minimum by means of an amalgamated zinc anode and the electrolyte saturated with zinc oxide. It is frequently seen that, if alkaline dry cells are air-tightly sealed, a small amount of electrolyte creeps along the inner surface of the top closure disc and arrives at its top surface. When a small quantity of electrolyte becomes exposed to the atmosphere on said top surface, such electrolyte reacts with the carbon dioxide in the air and forms an insulating film on said top closure disc. Incrustations formed by such insulating film will cause corrosion.

Electrolyte creepage is affected by the moisture in the atmosphere. Alkaline dry cells, which may be suitable for long-term operations in a dry atmosphere, may permit creepage of their electrolyte in a moist atmosphere. Electrolyte creepage may occur especially at tte anode, because the negative electric potential provided to a metal constituting the electrode will cause acceleration of electrolyte creepage.

There have been many cells proposed to solve the problem of electrolyte creepage and leakage. Alkaline dry cells of the double top disc structure disclosed in U.S. Patent No. 2,712,565, dated July 5, 1955, comprise, in combination, an inner can which constitutes one of the terminals of the cell, a top closure member for the inner can which constitutes the other terminal of the cell and comprises a pair of dished metal plates, and an insulating sealing collar confined between cooperating portions of said inner can and of said closure member and constitutes therewith a sealed enclosure for the cell. The above-mentioned dished plates are superimposed upon one another, their center portions being electrically connected and their marginal edges being slightly separated. The sealing member of elastic insulating material is compressed between cooperating marginal portions of said inner can and of the dished plates. The sealing member also extends into the interspace between the marginal edges of said plates. The marginal portions of said top discs are overlapped by an inwardly crimped portion of an outer can (jacket) which encircles the inner can, while said sealing collar is interposed under compression between said marginal portions of the dished plates and said inwardly crimped portion of the outer can. The outer can is constricted directly above the sealing collar so as to force the intermediate portion of the sealing collar into the interspace between the edges of the top discs and thereby further improve the air-tight enclosure for the cell.

Alkaline dry cells of the described type indeed prevented some electrolyte creepage and leakage, but experience has indicated that such alkaline dry cells cannot keep themselves free from electrolyte seepage for long periods of time.

It is an objective of the present invention to provide an alkaline dry cell which is free from electrolyte creepage for long periods of time.

It is a further objective of the present invention to provide an alkaline dry cell free from electrolyte leakage and including means adapted to release from the cell excessive internal pressures that may arise under abnormal operating conditions.

In accordance with the present invention, an alkaline dry cell has an outer metal case and an inner metal case. The outer metal case has a top opening and the inner metal case has an opening. The inner metal case is fitted within the outer metal case, the opening of the inner metal case facing the bottom of the outer metal case. The inner metal case holds active cell materials in place. The anode is positioned substantially at the center of the cell, followed in order by the electrolyte in a separator and the cathode. The cathode is in electrical contact with the inner metal case per se. A dished plate is fitted over the top surface of the inner metal case by means of a brim-shaped portion of the dished plate and is electrically connected with the inner metal case. The dished plate has one or more gas venting holes communicating with the atmosphere. The anode has a current collector which is electrically connected to the bottom portion of the outer metal case. The current collector consists of a base attached to the anode and a pointed portion electrically connected to the outer metal case. Preferably a metal disc (having good resistance to the alkaline electrolyte) is interposed between said pointed portion and the bottom portion of said outer metal case, the disc being tightly friction-fitted or spot-welded to said pointed portion of the current collector. The anode has at the other end an insulator spacer interposed between the top surface of the inner metal case and the anode. The spacer is preferably of elastic plastic resin and forms one-way gas valves over the venting holes of the dished plate.

The alkaline dry cell provided by this invention has double insulating sealing members. One is a bottom insulating sealing member which prevents seepage of the electrolyte from said bottom opening of the inner metal case. The other is a top insulating sealing collar which keeps the outer metal case electrically disconnected from marginal portions of the dished plate and the inner metal case. A suitable insulating sealing member is of the elastic synthetic resin, such as polyethylene and polyamide, which has good corrosion resistance to an alkaline electrolyte. The bottom sealing member has a body portion and a sleeve portion while the pointed portion of said current collector perforates through the body portion. Said pointed portion is shaped so that an osculatory region formed by the pointed portion and the bottom sealing member may be reduced to a desirable extent. The body portion of the bottom insulating sealing member has an annular peaked portion fitted into a tubular layer of the electrolyte which encircles the anode body. The annular peaked portion is so shaped that it may apply compression in a substantially central direction upon the body portion of said bottom insulating sealing member if excessive internal pressures in the cell are to cause displacement of the body portion. The sleeve portion of the bottom sealing member extends upward into the bottom interspace between the outer metal case and the inner metal case and is in contact with the bottom of the outer metal case. The sleeve portion is strongly compressed so as to seal tightly said bottom interspace. Preferably, the bottom insulating sealing member has its bottom caved-in substantially at the center thereof, thereby forming an interspace between the metal disc or the bottom portion of the outer metal case and the bottom sealing member per se. Such interspace is provided for the purpose of aiding displacement of said body portion caused by any excessive internal pressures. The outer metal case has a top marginal portion crimped inwardly to apply compression in a substantially axial direction upon the top sealing collar. The inner metal case and the dished plate are therefore maintained under compression. The bottom marginal portion of the inner metal case is also crimped inwardly so as to apply compression in a substantially radial direction upon the sleeve portion of the bottom insulating sealing member. A sleeve of absorbent material, such as alkali resistant paper, is interposed between the inner metal case and the outer metal case.

The bottom insulating sealing member is elastic enough to release from the cell any excessive increase in the internal pressure caused by a swell of the anode material and also to release hydrogen gas pressure that may result from abnormal operating conditions. Such excessive pressures will cause displacement of the body portion of the bottom sealing member, i.e., the body portion to be slightly pushed down toward the bottom of the cell. If the gas is to be accidentally forced out, taking any electrolyte with it into the interspace between the inner metal case and the outer metal case, then such electrolyte will be trapped in the sleeve of absorbent material and the gas alone will pass through the interspace between the top surface of the inner metal case and the brim-shaped portion of the dished plate. Then the gas will be released through a venting hole in the cylindrical wall of the dished plate. The brim-shaped portion and the top surface of the inner metal case form a friction-fit, but never prevent the gase from seeping.

The sealing structure of the described type can positively prevent the creepage and leakage of any electrolyte.

In order to make it easier to understand the present invention, its objectives and features, the invention shall be explained in detail in the following with reference to the accompanying drawing, which is a vertical sectional view of an alkaline cell embodying the invention.

An alkaline cell has an outer metal case 10, constituting the negative terminal of the cell, and an inner metal case 20, constituting the positive terminal of the cell. The inner metal case 20 has a bottom opening and holds active cell materials comprising the anode 30, the electrolyte absorbent paper 40 and the cathode 50. The anode 30 is of zinc and the electrolyte absorbent paper 40 includes caustic alkali. The cathode 50 is of one selected from the group consisting of mercuric oxide, manganese dioxide, and silver oxide. The anode 30 is positioned substantially at the center of the cell, followed in order by the electrolyte 40 and the cathode 50. The cathode is in electrical contact with the inner metal case 20. A dished metal plate 21 is fitted over the top surface of the inner metal case 20. The dished plate 21 is in electrical contact with the inner metal case by means of a brim-shaped portion 22. The dished plate has one or more gas venting holes 23 in its side cylindrical wall 24. The anode 30, in the form of a cylinder, has at one end an insulator spacer 60 in contact with the top surface of the inner metal case 20. The insulator spacer 60 has a diameter substantially equal to that of the anode body 30. The anode has at the other end a current collector 70 which is in electrical contact with the outer metal case 10 as well as the anode per se. The current collector consists of a base 71 having a diameter substantially equal to that of the anode body 30 and a pointed portion 72. The pointed portion 72 is spot-welded or friction-fitted (as indicated at 81) with a metal disc 80 and the disc 80 is attached to the outer metal case 10. The current collector 70 may be a solid metal or a metal plated piece. If it is a solid metal, the metal should be selected from, and if a coated metal or plastic the coating should be selected from, the group consisting of copper, zinc, tin, cadmium, silver, an alloy of copper and zinc, and an alloy of mercury combined, respectively, with copper, zinc, tin, cadmium, silver and said alloy of copper and zinc.

A bottom insulating sealing member 90 is an elastic synthetic resin comprising a body portion 91 sealing the bottom opening of the inner metal case and a sleeve portion 92 sealing the bottom interspace between the inner metal case 20 and the outer metal case 10. A sleeve of absorbent material 12 is interposed between the inner metal case and the outer metal case. The absorbent material is porous paper preferably having good resistance to any alkaline electrolyte. The pointed portion 72 of the current collector 70 perforates through the body portion 91 of the bottom sealing member and is electrically connected to a metal disc 80 attached to the outer metal case. The body portion 91 has an annular peaked portion 93 fitted into a tubular layer of the electrolyte 40. The sleeve portion 92 extends upward into the bottom interspace between the inner metal case 20 and the outer metal case 10. The bottom insulating sealing member has its bottom caved in, thereby forming a cavity 94. An insulating sealing collar 61 of an elastic synthetic resin (plastic) is provided as a top closure insulating the outer metal case 10 and the dished plate 21. The outer metal case has its marginal portion 11 crimped inwardly to apply substantially axial compression upon the insulating sealing collar 61. The bottom marginal portion 25 of the inner metal case is also crimped inwardly in aid of applying compression in substantially radial direction upon the sleeve portion 92.

Modifications may be made in the above-described embodiment within the scope of this invention.

What is claimed is:

1. An alkaline dry cell comprising an anode, an electrolyte in a separator and a cathode, in combination, an outer metal case constituting one of the terminals of the cell and having a top opening and an inwardly crimped marginal portion; an inner metal case constituting the other terminal of the cell, having a bottom opening and holding active cell materials; a conductive dished plate with a venting structure fitted over the top surface of said inner metal case and electrically connected with said inner metal case; a bottom insulating sealing member having a body portion to prevent seepage of the electrolyte from said bottom opening of the inner metal case and a sleeve portion in contact with the bottom of said outer metal case extending as far as a bottom interspace between the inner metal case and the outer metal case; a top insulating sealing member confined between at least said dished plate and said outer metal case; a current collector having a base attached to the anode and a pointed portion perforating through said bottom insulating sealing member so as to be in electrical contact with said outer metal case; and an electrolyte absorbent material interposed between the inner metal case and the outer metal case.

2. An alkaline cell as set forth in claim 1, wherein said body portion of the bottom sealing member has an annular sharpened portion fitted within the electrolyte layer within said inner metal case.

3. An alkaline cell as set forth in claim 1 wherein the inner case has an inwardly crimped marginal portion about its bottom opening.

4. An alkaline cell as set forth in claim 1 wherein the dished plate has a brim-shaped portion which fits over said inner case and where the outer surface contacts said top insulating member.

5. An alkaline cell as set forth in claim 1 wherein said bottom insulating sealing member has its bottom caved-in substantially at the center of the cell.

6. An alkaline cell as set forth in claim 1 wherein the inner metal case has its marginal portion crimped inwardly so as to apply compression in a substantially radial direction upon said sleeve portion of the bottom insulating sealing member.

7. An alkaline cell as set forth in claim 1, wherein a metal disc is interposed between said pointed portion of the current collector and the bottom portion of said outer case.

8. An alkaline cell as set forth in claim 1 wherein said anode current collector is a solid material of/or is covered with a conductor selected from the group consisting of copper, zinc, tin, cadmium, silver, an alloy of copper and zinc and an alloy of mercury combined respectively with copper, zinc, tin, cadmium, silver and said alloy of copper and zinc.

References Cited

UNITED STATES PATENTS

| 2,636,063 | 4/1953 | Schroeder | 136—133 |
| 3,096,217 | 7/1963 | Clune | 136—133 |
| 3,318,737 | 5/1967 | Watanabe et al. | 136—133 |

WINSTON A. DOUGLAS, *Primary Examiner.*

D. L. WALTON, *Assistant Examiner.*

U.S. Cl. X.R.

136—83, 166, 177